May 15, 1962   S. A. MANNA   3,034,636
STABILIZING RING ASSEMBLY
Filed June 20, 1960
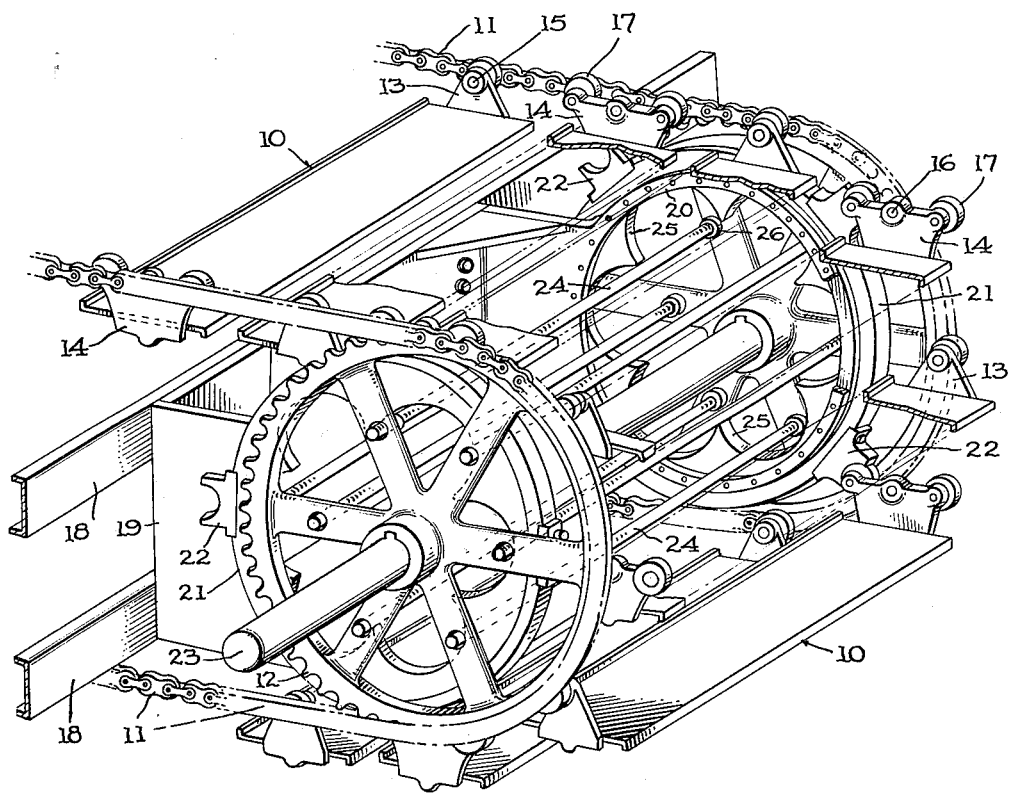
INVENTOR
SILVANO A. MANNA
BY [signature]
ATTORNEY

United States Patent Office 3,034,636
Patented May 15, 1962

3,034,636
STABILIZING RING ASSEMBLY
Silvano A. Manna, Willimansett, Mass., assignor to Diamond National Corporation, New York, N.Y., a corporation of Delaware
Filed June 20, 1960, Ser. No. 37,407
6 Claims. (Cl. 198—158)

The present invention relates to improvements in travelling tray conveyors and has particular reference to an improved means of causing a conveyor tray to maintain a horizontal position during its travel around a conveyor sprocket wheel.

With the new arrangement, it is possible for trays on a conveyor to keep a positive horizontal position throughout every portion of their circuit of travel around the conveyor even if the trays may happen to be loaded out of balance.

One of the advantages of the new apparatus lies in its elimination of the need for stationary cams which prior use has shown to be inefficient.

Also, through a positive action, a correctly predetermined conveyor tray position is maintained at all times during the travel of the tray along the conveyor.

These as well as further advantages which are inherent in the invention will become apparent from the following description, reference being had to the accompanying drawing wherein the sole FIGURE shows a stabilizing ring assembly.

Considering now the details of the illustrated embodiment of the invention, there are provided trays 10, which must maintain a horizontal position so as not to spill their contents at any time during the run. These are carried by the sprocket chain 11. Any other type of notched belt or chain may be used instead of sprocket chain 11 as long as it may be moved without undue slippage by conveyor sprocket wheel 12.

Each tray 10 may be kept level while travelling a straight path by any of several means. One method is through the use of horizontal tracks or the like, but since the invention is not concerned with that aspect of the apparatus, the tracks or other means are not shown in the drawing nor are they discussed further.

Connected to each tray 10 are brackets 13 and 14. Bracket 13 is approximately triangular in shape with bolt 15 attached to sprocket chain 11 passing through the bracket 13 and allowing the bracket to swing freely on bolt 15. Similarly, bracket 14 is allowed to swing freely on bolt 16, but bracket 14, having a shape different than that of bracket 13, has rollers 17 on each side of the fulcrum formed at bolt 16. Each tray 10 has a bracket 13 on one side and a bracket 14 on the other side with the type of bracket on any one side alternating with each tray.

Support channels 18 have support brackets 19 attached thereto. Support brackets 19 provide a mounting for an inner stationary ring 20 which has bearing inserts on its outside diameter. A rotating outer ring 21 rotates against these bearing inserts. The bearing inserts are not illustrated in the drawing since any means can be used here which would allow the rotation of an outer ring around an inner stationary ring. Roller retainers 22 are mounted on outer ring 21 so placed as to make contact with and hold rollers 17 during the travel path of tray 10 around sprocket wheels 12 and the combination thereby acts as a positive action leveling guide.

Shaft 23 is attached to some driving power (not shown) which turns the shaft and thereby rotates sprocket wheels 12 keyed to it and sprocket chain 11 carrying conveyor trays 10. Rods 24 are attached to the spokes of sprocket wheels 12 and rotate with the sprocket wheels. One cam follower 26 is mounted on each side of each rod 24. A scalloped cam profile 25 attached to the inside of outer ring 21 is contacted by cam followers 26 in their rotation and thus outer ring 21 moves in unison with sprocket wheels 12. It should be noted in the drawing that inner stationary ring 20 with rotating outer ring 21 are placed eccentrically with respect to sprocket wheels 12. This is done so that cam followers 26 may contact scalloped cam profile 25 at a predetermined point and lose contact at another predetermined point. This facilitates the timed appearance of each roller retainer 22 exactly when required to hold and guide a roller 17 and also allows parting of roller 17 and retainer 22 when its leveling influence is no longer needed.

One of the more specific advantages of the apparatus resides in the conveyance of trays of products through a drier oven with a turn around and return at different levels as required in the drying process. A further advantage lies in the positive assurance of level tray position at all times without depending merely on the weight of the tray and contents to exert a leveling effect.

From the foregoing, varied application of the novel aspects of the invention will occur to those skilled in the art, and variations in matters of detail will be apparent; and therefore reference should be made to the following claims in determining the full scope of the invention.

What is claimed is:
1. An apparatus for maintaining conveyor trays in a horizontal position in their path around a sprocket wheel, comprising a sprocket wheel, conveyor means mounted on said sprocket wheel, inwardly projecting cams mounted in operational relationship with said sprocket wheel, trays secured on rotatable brackets to said conveyor means, rollers located on advance and rearward corners of said brackets, and retainers travelling adjacent to said sprocket wheel in cammed relationship therewith and adapted to coact with said rollers located on the rearward corners during the travel of said trays in a path around said sprocket wheel from one horizontal plane of travel into another horizontal plane of travel.

2. An apparatus for maintaining conveyor trays in a horizontal position in their path around sprocket wheels, comprising a pair of sprocket wheels, parallel chains mounted on said sprocket wheels, inwardly projecting cams mounted in operational relationship with said sprocket wheels, brackets with their top parts rotatably secured to said chains, trays secured to the bottom parts of said brackets, rollers located on advance and rearward corners of said brackets, said rollers positioned on said brackets on alternate sides of each successive one of said trays, and retainers travelling adjacent to said sprocket wheels in cammed relationship therewith and adapted to coact with said rollers located on the rearward corners during the travel of said trays in a path around said sprocket wheels from one horizonal plane of travel into another horizontal plane of travel.

3. An apparatus for maintaining conveyor trays in a horizontal position in their path around a sprocket wheel, comprising a sprocket wheel, a chain mounted on said sprocket wheel, rotatable brackets securing the conveyor trays to said chain, rollers located on advance and rearward corners of said brackets, a stationary ring supported adjacent to said sprocket wheel, an outer ring rotatably supported on said stationary ring, cams projecting inwardly and attached to the inside circumference of said outer ring, and retainers mounted on said outer ring so as to rotate therewith in cammed relationship with said sprocket wheel whereby said retainers coact with said rollers to maintain the conveyor trays level.

4. An apparatus for maintaining conveyor trays in a horizontal position in their path around sprocket wheels, comprising a pair of sprocket wheels, parallel chains mounted on said sprocket wheels, conveyor trays carried by said chains, rotatable brackets connecting said conveyor trays to said parallel chains, rollers located on said brackets on the alternate side of each successive one of said trays, a stationary ring supported adjacent to each of said sprocket wheels, an outer ring rotatably supported on each of said stationary rings, scalloped cams projecting inward and attached to the inside circumference of each of said outer rings, and retainers mounted on said outer rings so as to rotate therewith in cammed relationship with said sprocket wheels whereby said retainers coact with said rollers to maintain the conveyor trays level.

5. An apparatus for maintaining conveyor trays in a horizontal position in their path around sprocket wheels comprising a pair of sprocket wheels, parallel chains mounted on said sprocket wheels, conveyor trays carried by said chains, rotatable brackets connecting said conveyor trays to said parallel chains, rollers located on said brackets on the alternate side of each successive one of said trays, a stationary ring supported adjacent to each of said sprocket wheels and in a position eccentric to said sprocket wheels, an outer ring rotatably supported on each of said stationary rings, scalloped cams projecting inward and attached to the inside circumference of each of said outer rings, and retainers mounted on said outer rings so as to rotate therewith in cammed relationship with said sprocket wheels whereby said retainers coact with said rollers to maintain the conveyor trays level.

6. An apparatus for maintaining conveyor trays in a horizontal position in their path around sprocket wheels, comprising a pair of sprocket wheels, parallel chains mounted on said sprocket wheels, conveyor trays carried by said chains, rotatable brackets connecting said conveyor trays to said parallel chains, rollers located on said brackets on the alternate side of each successive one of said trays, a stationary ring supported adjacent to each of said sprocket wheels and in a position eccentric to said sprocket wheel, an outer ring rotatably supported on each of said stationary rings, cross rods attached between the spokes of said pair of sprocket wheels, scalloped cams projecting inward and attached to the inside circumference of each of said outer rings in position so as to be contacted and moved by said cross rods during a portion of the rotation of the sprocket wheels, and retainers mounted on said outer rings so as to rotate therewith in cammed relationship with said sprocket wheels whereby said retainers coact with said rollers to maintain the conveyor trays level.

References Cited in the file of this patent
UNITED STATES PATENTS

| | | |
|---|---|---|
| 1,592,412 | Anderson et al. | July 23, 1926 |
| 1,984,685 | Marcy | Dec. 18, 1934 |
| 2,663,624 | Hutchins | Dec. 22, 1953 |
| 2,703,643 | Parsons | Mar. 8, 1955 |